United States Patent
Liang (10) Patent No.: US 10,941,066 B2
(45) Date of Patent: Mar. 9, 2021

(54) PROTECTION FILM FOR A TERMINAL CURVED SURFACE AND MANUFACTURE METHOD THEREOF

(71) Applicant: SHENZHEN KANGCHENGTAI INDUSTRIAL CO., LTD., Shenzhen (CN)

(72) Inventor: Zhaofei Liang, Shenzhen (CN)

(73) Assignee: SHENZHEN KANGCHENGTAI INDUSTRIAL CO., LTD., Shenzhen (CN)

( * ) Notice: Subject to any disclaimer, the term of this patent is extended or adjusted under 35 U.S.C. 154(b) by 136 days.

(21) Appl. No.: 16/108,611

(22) Filed: Aug. 22, 2018

(65) Prior Publication Data
US 2020/0017391 A1    Jan. 16, 2020

(30) Foreign Application Priority Data
Jul. 12, 2018  (CN) .......................... 201810764791.3

(51) Int. Cl.
*C03B 11/08* (2006.01)
*C03B 11/12* (2006.01)
(Continued)

(52) U.S. Cl.
CPC ............ *C03B 11/08* (2013.01); *C03B 11/122* (2013.01); *C03B 11/125* (2013.01);
(Continued)

(58) Field of Classification Search
CPC ..... C03B 11/08; C03B 11/122; C03B 11/125; C03B 33/091; C03C 17/001; B29C 43/00;
(Continued)

(56) References Cited

U.S. PATENT DOCUMENTS

2017/0106610 A1 *  4/2017  Manera ................. B29C 70/086
2017/0341969 A1 * 11/2017  Chau ...................... C03B 25/025

FOREIGN PATENT DOCUMENTS

CN    206357713     *  7/2017
CN    107187128 A      9/2017

* cited by examiner

*Primary Examiner* — Stella K Yi
(74) *Attorney, Agent, or Firm* — Nixon & Vanderhye, P.C.

(57) ABSTRACT

The present application belongs to the technical field of manufacture for protection film for a terminal curved surface, and relates to a protection film for a terminal curved surface and manufacture method thereof, the hardened layers is provided on both sides of the substrate layer, and the substrate layer and the two hardened layers form the original sheet. The original sheet is hot-pressed by a hot pressing device, and the upper mold and the lower mold clamping the original sheet are heated, pressurized and cooled in order to obtain a protection film for a terminal curved surface, and the mold core outer rounded corner combining with the mold cavity inner rounded corner are pressurized to form a curved surface portion. The hardened layers is disposed on both sides of the substrate layer, so that the stress on both sides of the substrate layer are cancel each other after the substrate layer is heated, and the terminal surface protective film is more flat. The protection film for a terminal curved surface is easy to be molded, sensitive to be touched, high in hardness, and the outer side hardness can reach 9H, which is not easy to produce scratches, anti-fingerprint, anti-fragmentation edge, explosion-proof, and the protection film for a terminal curved surface has a curved surface portion suitable for protecting the terminal curved screen.

10 Claims, 6 Drawing Sheets

(51) Int. Cl.
*C03B 33/09* (2006.01)
*C03C 17/00* (2006.01)
(52) U.S. Cl.
CPC .......... *C03B 33/091* (2013.01); *C03C 17/001* (2013.01); *C03C 2217/78* (2013.01); *C03C 2218/365* (2013.01)
(58) Field of Classification Search
CPC ..... B29C 43/18; B29C 43/184; B29C 43/206; B29C 43/28; B29C 43/361; B29C 43/56; B29C 44/0453; B29C 51/00; B29C 61/006; B29C 70/34; B29C 43/183; B29C 51/14
See application file for complete search history.

PROTECTION FILM FOR A TERMINAL CURVED SURFACE AND MANUFACTURE METHOD THEREOF

This application claims priority to CN Patent Application No. 201810764791.3 filed 12 Jul. 2018, the entire contents of which is hereby incorporated by reference.

TECHNICAL FIELD

The present application relates the technical field of manufacturing a terminal protective film, and more particularly to a protection film for a terminal curved surface and manufacture method thereof.

BACKGROUND

With the advent of the 4G/5G era, more and more mobile phones use curved glass as a mobile phone screen. The protective film sticking on the screen has become an inseparable part of current mobile phone users. At present, the terminal protective film commonly used in the market includes: a ordinary PET protective film, TPU flexible protective film and tempered glass film. The ordinary PET protective film has shortcomings such as low hardness, easy to scratch, poor anti-fingerprint, no explosion-proof screen and poor hand feeling, and the market acceptance is relatively low. The TPU flexible protective film is easy to produce bubbles and misalignment when it is attached, it is inconvenient to use, has no hardness, and is easy to scratch the surface. The tempered glass film has the characteristics of good exhausting effect, high light transmittance, high hardness, anti-fingerprint, not easy to scratch, explosion-proof screen, etc. It becomes the mainstream product of the terminal protective film, but the tempered glass isn't easy to mold, complicated in molding process, low yield, high cost, and the film is explosive and other weakness. In particular, after the tempered glass film bursts, a lot of glass fragments are generated, which is easy to scratch the fingers. In the face of diversified social development trends, the tempered glass film can no longer meet people's needs. The curved surface protection film is attached to the terminal curved screen to protect the curved screen. However, the hardness of the existing curved protective film cannot reach 9H, the hardness is low, the scratch is easy, and the anti-fingerprint is poor.

SUMMARY

An object of the present application is provided a protection film for a terminal curved surface and manufacture method thereof in order to solve the technical problem that the present protection film for a terminal curved surface is easy to scratch and anti-fingerprint poor, or isn't easy to mold, the film is explosive and after the film bursts, a lot of glass fragments are generated.

In order to achieve the above object, the technical solution adopted by the present application is to provide a manufacture method for the protection film for a terminal curved surface, comprising:

S1) providing an original sheet, wherein the original sheet comprises a substrate layer and two hardened layers respectively disposed on opposite sides of the substrate layer; and S2) hot pressing the original sheet by a hot pressing device, wherein the hot pressing device comprises an upper mold having a mold core a lower mold matching with the upper mold to press the original sheet, the lower mold has a mold cavity adapting to the mold core, the lower mold is provided with an inner rounded corner at a bottom edge of the mold cavity, a side of the mold core is provided with an outer rounded corner matching with the inner rounded corner; placing the original sheet in the mold cavity, and heating the upper mold and the lower mold clamping the original sheet to a set heating temperature, pressurizing the upper mold and the lower mold, and cooling the upper mold and the lower mold to a set cooling temperature, such that the original sheet becomes a terminal curved surface protective film having a curved surface portion.

The present application provides a protection film for a terminal curved surface, comprising a substrate layer, two hardened layers respectively disposed on opposite sides of the substrate layer, and two release films with each disposed on one side of a corresponding hardened layer away from the side where the substrate layer is located; and the substrate layer and the two hardened layer are formed by hot pressing, and the protection film for a terminal curved surface has a curved surface portion.

The technical effect of the present application relative to the prior art is: the hardened layers is provided on both sides of the substrate layer, and the substrate layer and the two hardened layers form the original sheet. The original sheet is hot-pressed by a hot pressing device, and the upper mold and the lower mold clamping the original sheet are heated, pressurized and cooled in order to obtain a protection film for a terminal curved surface, and the mold core outer rounded corner combining with the mold cavity inner rounded corner are pressurized to form a curved surface portion. The hardened layers is disposed on both sides of the substrate layer, so that the stress on both sides of the substrate layer are cancel each other after the substrate layer is heated, and the terminal surface protective film is more flat. The protection film for a terminal curved surface is easy to be molded, sensitive to be touched, high in hardness, and the outer side hardness can reach 9H, which is not easy to produce scratches, anti-fingerprint, anti-fragmentation edge, explosion-proof, and the protection film for a terminal curved surface has a curved surface portion suitable for protecting the terminal curved screen.

BRIEF DESCRIPTION OF THE DRAWINGS

In order to make the technical solutions in the embodiments of the present application clearer, the accompanying drawings to be used in the embodiments and the description of the prior art will be briefly introduced below, it is apparent that the drawings in the following description are merely some embodiments of the present application and that other drawings may be obtained by those skilled in the field without departing from the inventive nature of the application.

DETAILED DESCRIPTION OF THE EMBODIMENTS

In order to make the technical problems to be solved, technical solutions, and beneficial effects of the present application clearer and more understandable, the present application will be further described in detail herein after with reference to the accompanying drawings and embodiments. It should be understood that the embodiments described herein are only intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

It should be understood that, "length", "width", "upper", "lower", "front", "back", "left" and "right", "vertical", "horizontal", "top", "bottom", "inside", "outside" and other terms indicating the orientation or positional relationship are based on orientation or positional relationship shown in the drawings, and are only for the purpose of facilitating the description of the application and simplifying the description, instead of indicating or implying that the indicated device or component must have a specific orientation and constructed and operated in a particular orientation, and therefore it cannot be construed as limitation of the application.

Figure 1:
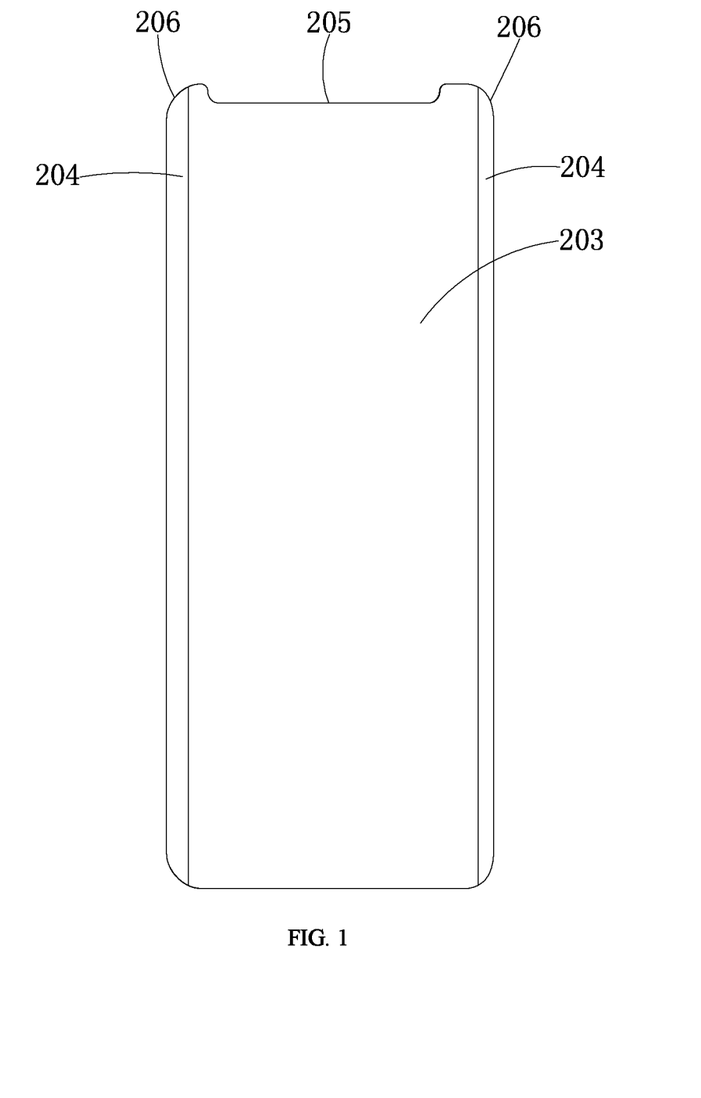
FIG. 1 is a perspective assembly view of a protection film for a terminal curved surface provided by an embodiment of the present application.
Figure 2:
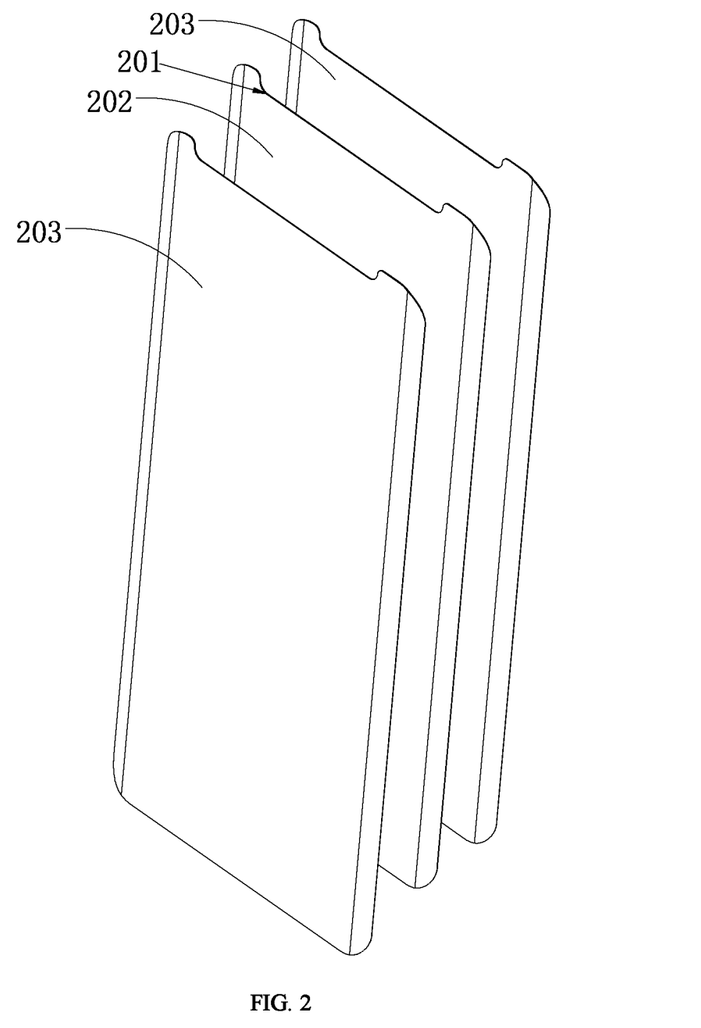
FIG. 2 is a perspective exploded view of the protection film for a terminal curved surface in FIG. 1.
Figure 3:
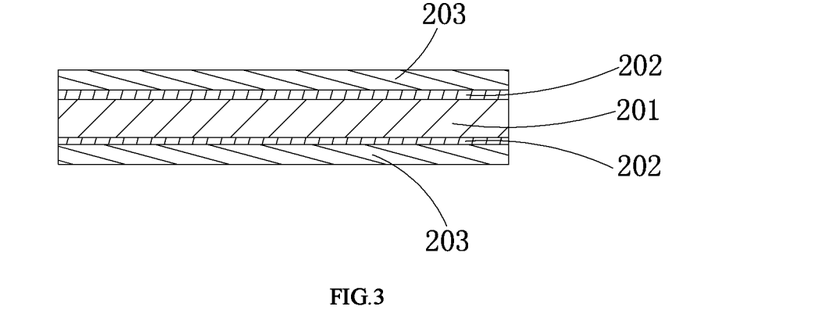
FIG. 3 is a sectioned view of the protection film for a terminal curved surface in FIG. 1.

A method for manufacturing a protection film for a terminal curved surface provided by the present invention will be described firstly. The method for manufacturing the protection film for a terminal curved surface, comprising:

S1) please refer to FIG. 1 to FIG. 3, providing an original sheet, the original sheet comprises a substrate layer 201 and two hardened layers 202 respectively disposed on opposite sides of the substrate layer 201;

S2) please refer to FIG. 4 to FIG. 9, hot pressing the original sheet by a hot pressing device 100, the hot pressing device 100 comprises an upper mold 10 having a mold core 11, and a lower mold 20 matching with the upper mold 10 to press the original sheet, the lower mold 20 has a mold cavity 21 adapting to the mold core 11, the lower mold 20 is provided with an inner rounded corner 211 at a bottom edge of the mold cavity 21, a side of the mold core 11 is provided an outer rounded corner 111 matching with the inner rounded corner 211; placing the original sheet in the mold cavity 21, and heating the upper mold 10 and the lower mold 20 sandwiching the original sheet to a set heating temperature, pressurizing the the upper mold 10 and the lower mold 20, and cooling the upper mold 10 and the lower mold 20 to a set cooling temperature, such that the original sheet becomes a protection film for a terminal curved surface having a curved surface portion 204.

The hardened layers 202 is provided on both sides of the substrate layer 201, and the substrate layer 201 and the two hardened layers 202 form the original sheet. The original sheet is hot-pressed by a hot pressing device 100, and the upper mold 10 and the lower mold 20 holding the original sheet are heated, pressurized and cooled in order to obtain a protection film for a terminal curved surface, and the mold core 11 outer rounded corner 111 combining with the mold cavity 21 inner rounded corner 211 are pressurized to form a curved surface portion 204. The hardened layers 202 is disposed on both sides of the substrate layer 201, so that the stress on both sides of the substrate layer 201 are canceled each other after the substrate layer 201 is heated, and the terminal surface protective film is more flat. The protection film for a terminal curved surface is easy to be molded, sensitive to be touched, high in hardness, and the outer side hardness can reach 9H, which is not easy to produce scratches, anti-fingerprint, anti-fragmentation edge, explosion-proof, and the protection film for a terminal curved surface has a curved surface portion 204 suitable for protecting the terminal curved screen.

Please refer to FIG. 4 to FIG. 9, the hot pressing device 100 has a heating position, a cooling position, and a take-out position. The heating position, the cooling position and the take-out position are arranged at intervals. In step S2), the original sheet is placed between the lower mold 20 and the upper mold 10. Specifically, the original sheet is placed in the lower mold 20, and the upper mold 10 is placed on the lower mold 20 by a robot. The mold lower mold 20 and the upper mold 10 held with the original sheet are rotated to a heating position for heating, after heated to a set heating temperature, and automatically rotated to the cooling position, and the upper mold 10 and the lower mold 20 are pressurized and cooled. Then, it is automatically rotated to the take-out position, and the lower mold 20 is separated from the upper mold 10 by a robot, and the protection film for a terminal curved surface between the upper mold 10 and the lower mold 20 is taken out.

Further, as a specific embodiment of the manufacture method for the protection film for a terminal curved surface provided by the present application, in step S1), the original sheet is cut by a laser machine to form an original sheet having a satisfied size. The scheme is easy to control, and the original sheet of the size-matched is obtained for subsequent hot pressing.

The substrate layer 201 is made of at least one of PET (polyethylene terephthalate), PMMA (polymethyl methacrylate), and PC (polycarbonate). The substrate layer 201 is structurally stable, so that the protection film for a terminal curved surface has good thermal bending performance, and can meet various curved surface display devices through high temperature molding. The substrate layer 201 is combined with the hardened layers 202, so that the protection film for a terminal curved surface has the property that the polymer protective film is not easily broken and explosion. In addition, the outer side of the hardened layer 202 by attaching function layer to increase the effects of preventing purple light, blue light, anti-spy, and anti-glare or the like.

Further, please refer to FIGS. 1 to 3, as a specific embodiment manner of the manufacture method for the protection film for a terminal curved surface provided by the present application, in step S1), the thickness of the substrate layer 201 ranges from 0.08 mm to 0.25 mm, the thickness of the hardened layer 202 ranges from 0.01 mm to 0.10 mm. The thickness of the substrate layer 201 is greater than or equal to the thickness of the hardened layer 202. The terminal surface protection film has a hardness reach 9H, and is not easily scratched when a sharp object slides over. The thickness of the substrate layer 201 ranges from 0.10 mm to 0.20 mm. The thickness of the structure is small, and the hardened layer 202 is applied to the surface of the substrate layer 201 by a UV coater, so that the hardness of the terminal curved protective film can reach 9H, and it is not easy to be scratched when the sharp object slides over. Preferably, the thickness of the substrate layer 201 is 0.188 mm, and the thickness of the hardened layer 202 is 0.03 mm, and the thickness of the structure is small, so that the hardness of the terminal curved protective film can reach up to 9H. The hardened layer 202 has a temperature resistance range of 160° C. to 230° C., which ensures the normal use of the terminal curved protective film when it is placed on the terminal screen. The thickness of the release film 203 ranges from 0.01 mm to 0.10 mm, and the thickness of the structure is small. Preferably, the thickness of the release film 203 is 0.09 mm, and the thickness of the structure is small.

The terminal surface protection film is rectangular. This structure is easy to cover on the terminal screen. The number of curved surface portions 204 is two, and the two curved surface portions 204 are respectively located on opposite side edges of the protection film for a terminal curved surface, and the two curved surface portions 204 are curved toward the same side. The structure is easy to be molded and is easy to attached on the curved screen of the terminal to protect it. A groove 205 is defined in the upper side of the protection film for a terminal curved surface. The groove 205 facilitates avoidance of the terminal camera or other devices. The ends of the terminal curved protective film are provided with rounded corners 206. The structure is easy to shape and protects the user from scratches.

Further, please refer to FIG. 4 to FIG. 9, as a specific embodiment manner of the manufacture method for the protection film for a terminal curved surface provided by the present application, in step S1), the hardened layers 202 are formed on the opposite sides of the substrate layer 201 by coating and curing a UV coating by a UV coater. The surface of the substrate layer 201 is hardened by a UV coater, and the two hardened layers 202 are sequentially hardened. The hardness of the hardened layer 202 on the outer side of the substrate layer 201 ranges from 7H to 9H, and the hardness of the hardened layer 202 on the inner side of the substrate layer 201 ranges from 2H to 4H. Specifically, the outer surface of the substrate layer 201 is first cured to form a hardened layer 202 of 9H hardness by the UV coater through coating with a UV coating, and then the inner surface of the substrate layer 201 is cured to form a hardened layer 202 of 4H hardness by the UV coater through coating with a UV coating. The UV coating may be a UV glue or other UV coating, the UV coating is coated to both sides of the substrate layer 201 by a UV coater and cured to form a hardened layer 202, and the structure is easy to be molded and can improve both sides hardness of the terminal curved protective film. The substrate layer 201 is provided with the hardened layer 202 on both sides of the substrate layer 201, so that the stress on both sides of the substrate layer 201 is cancelled, and the terminal surface protective film is more flat. It should be noted that when the hardened layer is provided on one side of the substrate layer 201, due that the hardened layer has stress, and after the substrate layer 201 is heated, the substrate layer 201 is severely deformed to the hardened surface.

Further, please refer to FIG. 4 to FIG. 9, as a specific embodiment manner of the manufacture method for the protection film for a terminal curved surface provided by the present application, in step S2), the starting temperature of the upper mold 10 and the lower mold 20 clamping with the original sheet ranges from 30° C. to 40° C., the set heating temperature ranges from 145° C. to 175° C., and the set cooling temperature is ranged from 30° C. to 45° C. The heating and cooling processes to the upper mold 10 and the lower mold 20 can make the terminal curved protective film have a hardness reach 9H, and is not easily scratched when the sharp object slides over. The heating rate is ranges from 40% to 65%. The heat retention time after the temperature rise is 5 s to 20 s, which facilitates the pressure forming of the original sheet in the upper mold 10 and the lower mold 20. The cooling time is 35 s to 60 s, which facilitates the pressure forming of the original sheet between the upper mold 10 and the lower mold 20.

Figure 4:
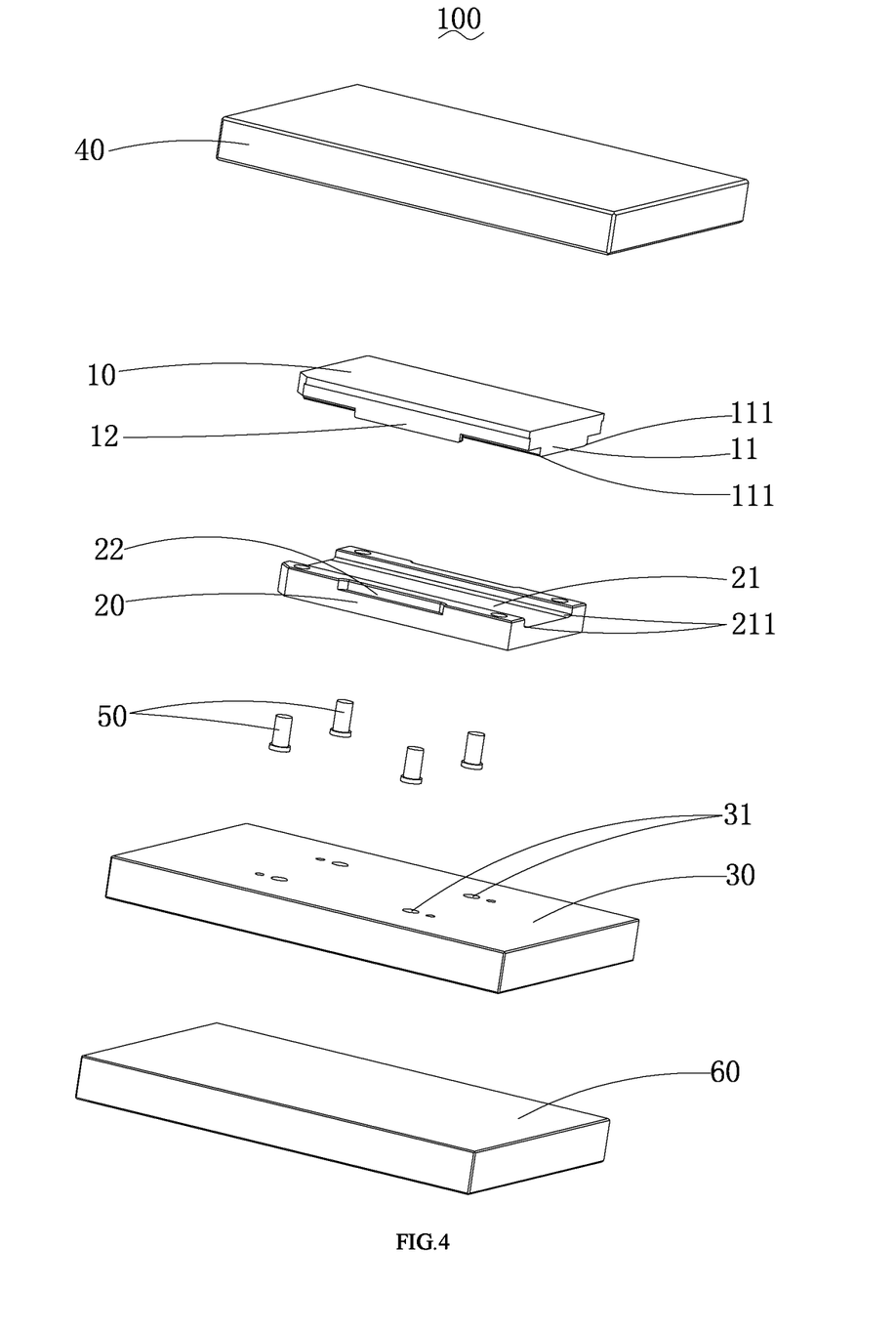
FIG. 4 is a perspective exploded view of a hot pressing device provided by an embodiment of the present application.
Figure 5:
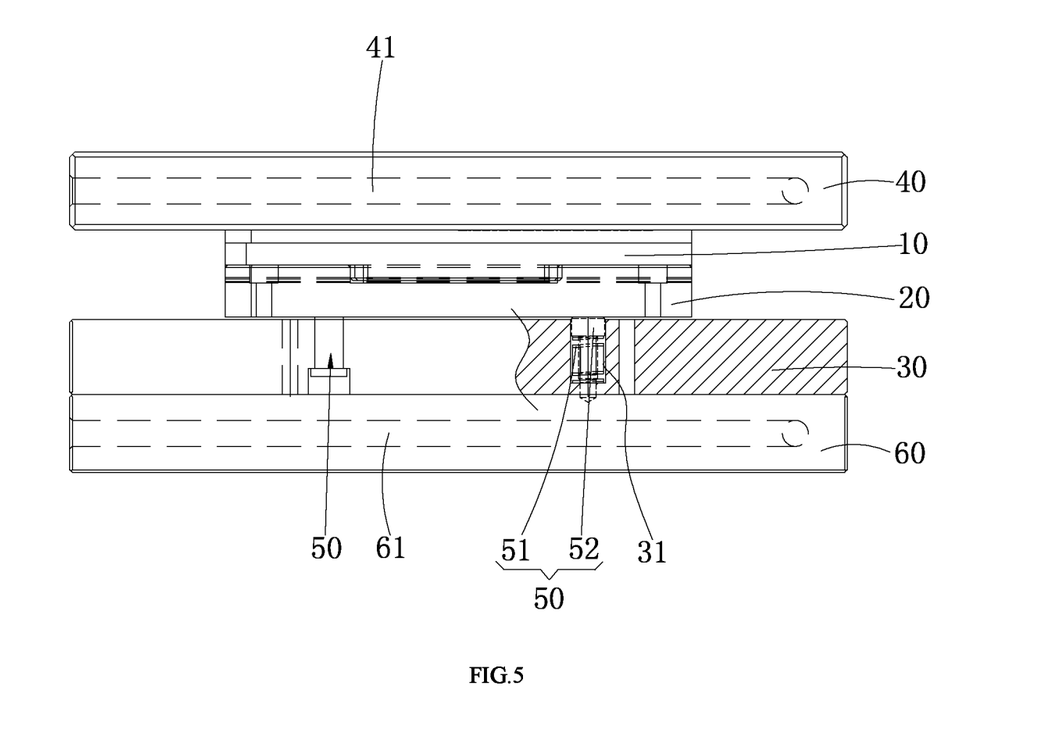
FIG. 5 is a partial sectioned view of the hot pressing device in FIG. 4.
Figure 6:
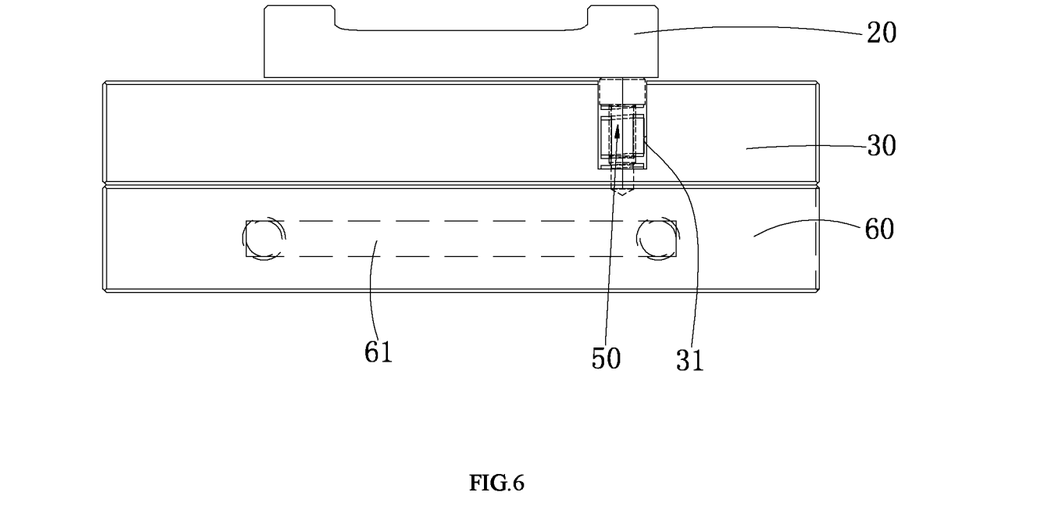
FIG. 6 is a schematic view of the hot pressing device when the upper mold is not placed on the lower mold in FIG. 4.

Further, as a specific embodiment manner of the manufacture method for the protection film for a terminal curved surface provided by the present application, in step S2), the hot pressing device 100 further comprises a fixing board 30 disposed under the lower mold 20, an upper board 40 for pressing the upper mold 10 disposed above the upper mold 10, an elastic ejector 50 for pushing the lower mold 20 to space the lower mold 20 and the fixing board 30, and a lower board 60 is disposed under the fixing board 30, the elastic ejector 50 is mounted on the fixing board 30; the step of pressurizing the upper mold 10 and the lower mold 20 comprises raising the fixing board 30 upward and pressing the upper board 40 downward after the fixing board 30 is raised into the right position, therefore, the upper board 40 is pressed against the upper mold 10, and the elastic ejector 50 is moved downward and the lower mold 20 is pressed against the fixing board 30.

Figure 7:
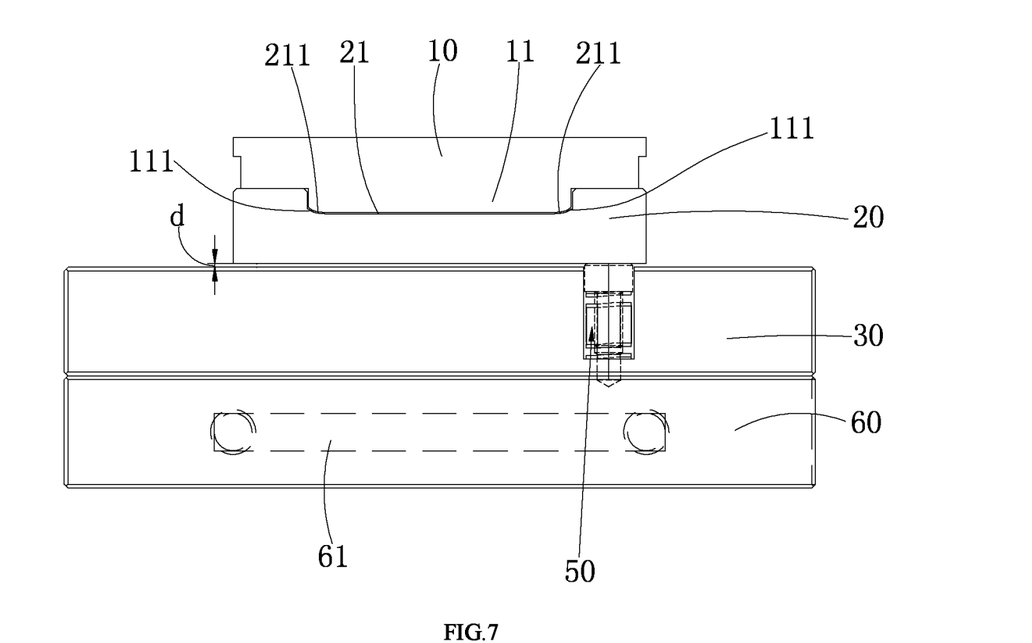
FIG. 7 is a schematic view of the hot pressing device when the upper mold is placed on the lower mold in FIG. 6.
Figure 8:
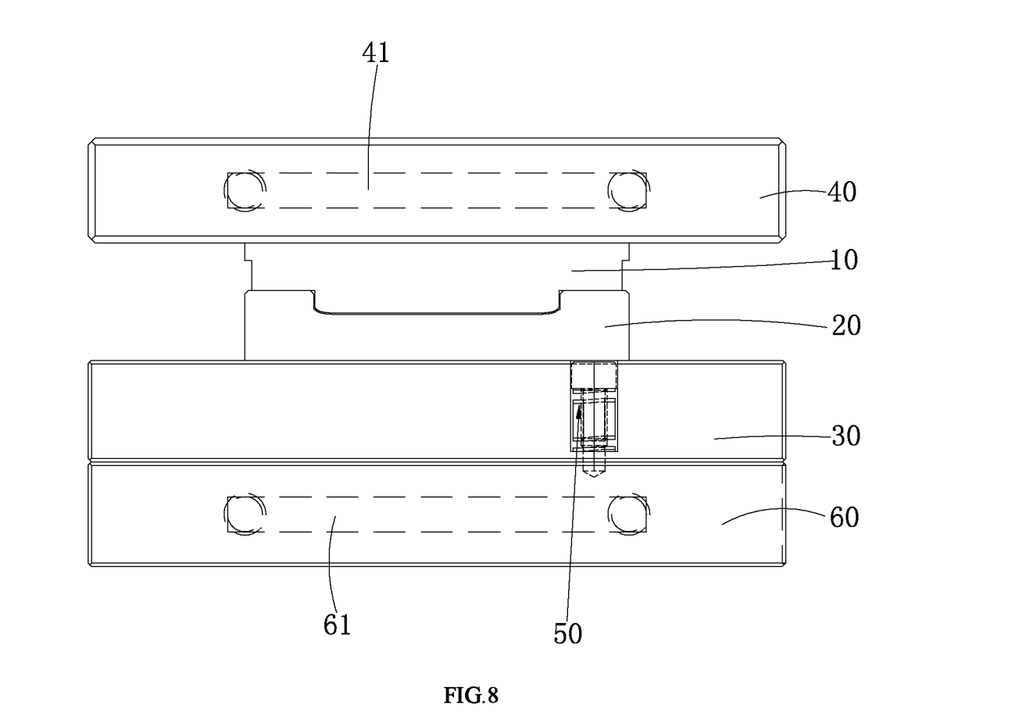
FIG. 8 is a schematic view of the hot pressing device when the upper board is pressed on the upper mold in FIG. 7.

Before the protective film is pressed by the upper mold 10 and the lower mold 20, heating the upper mold 10 and the lower mold 20 clamping the protective film. Referring to FIG. 7, the elastic ejector 50 pushes the lower mold 20 to space the lower mold 20 and fixing boards 30, such that the heat of the lower mold 20 is not quickly transferred to the fixing board 30. Referring to FIG. 8, when the upper board 40 pressurizes the upper mold 10, the elastic ejector 50 is compressed, the lower mold 20 is pressed against the fixing board 30, and the upper mold 10 and the lower mold 20 are press-formed to form a protective film. The upper mold 10 is pressed against the upper board 40, and the lower mold 20 is pressed against the fixing board 30 to cool the upper mold 10 and the lower mold 20. After the temperature reaches the set cooling temperature, referring to FIG. 9, the upper board 40 and the fixing board 30 are returned, and the position is automatically rotated to the take-out position, and the protection film for a terminal curved surface between the upper mold 10 and the lower mold 20 is taken out. When the upper board 40 is separated from the upper mold 10, the elastic ejector 50 is reset to lift and the lower mold 20 and the upper mold 10, and the lower mold 20 is separated from the fixing board 30. The hot pressing device 100 has good quality in forming the protective film, and avoids the mold which is equipped with the protective film may be quickly cooled to cause hardening and deformation of the protective film, and solves the problem that it is difficult for the existing hot pressing device to be pressed to form a terminal surface protection film with highest hardness reach 9H. The structure is convenient for forming the curved surface portion of the protective film, forming a protection film for a terminal curved surface, and is suitable for the protection of the terminal curved screen. The terminal surface protection film is easy to form, sensitive to touch, high in hardness, and the outer side hardness can reach 9H, which is not easy to produce scratches, anti-fingerprint, anti-fragmentation and explosion-proof.

Please refer to FIG. 7, when the upper mold 10 and the lower mold 20 clamping the protective film are placed on the elastic ejector 50, and when the upper board 40 is not pressed against the upper mold 10, the distance d between the lower mold 20 and the fixing board 30 is range from 0.1 mm to 0.5 mm so that heat of the lower mold 20 is not quickly transferred to the fixing board 30. If the heated upper mold 10 and the lower mold 20 are directly placed on the fixing board 30, that is, the lower mold 20 is in close contact with the fixing board 30, the heat of the lower mold 20 is quickly transferred to the fixing board 30, thereby making the ambient temperature of the pressed protective film original sheet is lowered, it is impossible to produce a protection film for a terminal curved surface with an outer hardness reach 9H, and only a terminal planar protective film reach 9H can be produced. The protective film hot pressing device 100 has good quality in forming the protective film, and avoids the situation that the existing mold with the protective film is quickly cooled to cause hardening and deformation of the protective film, and solves the problem that it is difficult for the existing hot pressing device to be pressed to form a terminal surface protection film with highest hardness reach 9H.

Please refer to FIG. 4, the upper mold 10 has a positioning edge 12, and the lower mold 20 has a positioning groove 22 for the positioning edge 12 to be inserted. This structure facilitates the aligned and positioned of the upper mold 10 and the lower mold 20, so that the upper mold 10 and the lower mold 20 cooperate to form a good quality protective film. The two positioning edges 12 are spaced apart from each other on the left and right sides of the upper mold 10, the two positioning grooves 22 are spaced apart from each other on the left and right sides of the lower mold 20, so that the upper mold 10 and the lower mold 20 can be reliably aligned and positioned.

Please refer to FIG. 5, the fixing board 30 is provided with a mounting hole 31 for accommodating the elastic ejector 50. The structure is easy to machine and facilitates the assembly of the elastic ejector 50. The elastic ejector 50 comprises an elastic member 51 and an abutment rod 52 that is pushed toward the lower mold 20 by the elastic member 51. The elastic member 51 is a spring, and the spring is sleeved outside the abutment rod 52, and the head of the abutment rod 52 towards the lower mold 20. The number of the elastic ejectors 50 is at least two, and the elastic ejectors 50 are spaced apart from each other by the fixing board 30. The structure is easy to assemble, and the lower mold 20 can be reliably pushed down to keep the lower mold 20 and the fixing board 30 spaced apart, thereby reducing heat transfer between the lower mold 20 and the fixing board 30. A linear driving member (not shown in the figures) for driving the movement of the lower board 60 is connected to the bottom surface of the lower board 60. A linear driving member (not shown in the figures) for driving the movement of the upper board 40 is connected to the upper board 40. The structure is easy to assemble, so that the lower board 60 and the upper board 40 are moved to press-form the protective film. The linear driving member can be a cylinder or other linear driving member.

Further, please refer to FIG. 5 and FIG. 8, as a specific embodiment manner of the manufacture method for the protection film for a terminal curved surface provided by the present application, in the step S2), the upper board 40 is provided with an upper cooling water channel 41, and the lower board 60 is provided with a lower cooling water channel 61, and the cooling water is injected through the upper cooling water channel 41 and the lower cooling water channel 61 to cool the upper mold 10 and the lower mold 20 to a set cooling temperature. The upper mold 10 and the lower mold 20 are cooled by circulating water, that is, the original sheet is cooled, so that the original sheet is press-formed between the upper mold 10 and the lower mold 20. The hot pressing device 100 has a good quality in forming protective film, and the mold which is equipped with the protective film can be quickly cooled to cause hardening and deformation of the protective film, and solves the problem that it is difficult for the existing hot pressing device to be pressed to form a terminal surface protection film with highest hardness reach 9H.

Figure 9:
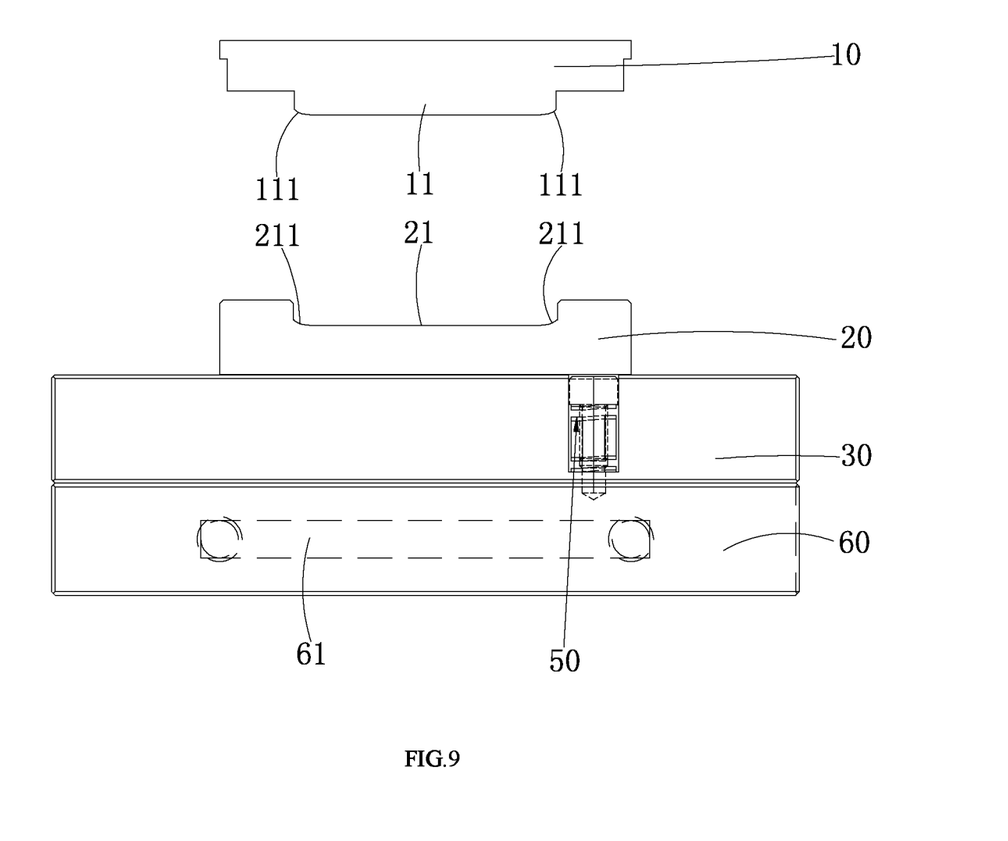
FIG. 9 is a schematic view of the hot pressing device when the upper mold is separated with the lower mold in FIG. 8.

Further, please refer to FIG. 9, as a specific embodiment manner of the manufacture method for the protection film for a terminal curved surface provided by the present application, in step S2), after the upper mold 10 and the lower mold 20 are cooled to the set cooling temperature, the manufacture method also comprises returning the upper board 40 and separating the fixing board 30 and the upper mold 10. It is convenient for the next press-formed of the original sheet to improve work efficiency.

Further, as a specific embodiment manner of the manufacture method for the protection film for a terminal curved surface provided by the present application, in step S2), the upper mold 10 and the lower mold 20 clamping the original sheet are heated to set heating temperature by a heater. The heater is a high-frequency magnetic field heater, and the upper mold 10 and the lower mold 20 clamping the protective film are instantaneously heated to facilitate the formation of the protective film.

Further, as a specific embodiment manner of the manufacture method for the protection film for a terminal curved surface provided by the present application, the method further comprises the step S3), the hardened layer 202 located on the inner side is provided with an adhesive layer, and the original sheet having the adhesive layer is provided with a release film 203 on each of the two sides thereof. The release film 203 is used to protect the original sheet. After the release film 203 is peeled off, the adhesive layer is attached to the terminal screen to realize the installation of the protection film for a terminal curved surface. Preferably, the adhesive layer is AB optical glue or other adhesive glue, which can make the protection film for a terminal curved surface have good impact resistance.

The present application further provides a protection film for a terminal curved surface, which is manufactured by the manufacture method the protection film for a terminal curved surface of any of the above embodiments. the hardened layers 202 is provided on both sides of the substrate layer 201, and the substrate layer 201 and the two hardened layers 202 form the original sheet. The original sheet is hot-pressed by a hot pressing device 100, and the upper mold 10 and the lower mold 20 clamping the original sheet are heated, pressurized and cooled in order to obtain a protection film for a terminal curved surface, and the mold core 11 outer rounded corner 111 combining with the mold cavity 21 inner rounded corner 211 are pressurized to form a curved surface portion 204. The hardened layers 202 is disposed on both sides of the substrate layer 201, so that the stress on both sides of the substrate layer 201 are canceled each other after the substrate layer 201 is heated, and the terminal surface protective film is more flat, the protection film for a terminal curved surface is easy to be molded, sensitive to be touched, high in hardness, and the outer side hardness can reach 9H, which is not easy to produce scratches, anti-fingerprint, anti-fragmentation edge, explosion-proof, and the protection film for a terminal curved surface has a curved surface portion 204 suitable for protecting the terminal curved screen.

The present application further provides a protection film for a terminal curved surface, comprising a substrate layer 201, two hardened layers 202 respectively disposed on opposite sides of the substrate layer 201, and two release films 203 with each disposed on one side of a corresponding hardened layer 202 away from the side where the substrate layer 201 is located; and the substrate layer 201 and the two hardened layer 202 are formed by hot pressing, and the protection film for a terminal curved surface has a curved surface portion 204. the hardened layers 202 is provided on both sides of the substrate layer 201, the substrate layer 201 and the two hardened layer 202 are hot press forming, and the outer side surface of the hardened layer 202 is provided with the release film 203. The substrate layer 201 is provided with the hardened layer 202 on both sides of the substrate layer 201, so that the stress on both sides of the substrate layer 201 is canceled, and the terminal surface protective film is more flat, the protection film for a terminal curved surface is easy to be molded, sensitive to be touched, high in hardness, and the outer side hardness can reach 9H, which is not easy to produce scratches, anti-fingerprint, anti-fragmentation edge, explosion-proof, and the protection film for a terminal curved surface has a curved surface portion 204 suitable for protecting the terminal curved screen.

In the above embodiments, the descriptions of the various embodiments are different, and the parts that are not detailed or described in a certain embodiment can be referred to the related descriptions of other embodiments.

The aforementioned embodiments are only preferred embodiments of the present application, and are not intended to limit the present application. Any modification, equivalent replacement, improvement, and so on, which are made within the spirit and the principle of the present application, should be included in the scope of the present utility model. Therefore, the scope of the present application is subject to the scope of the claims.

What is claimed is:

1. A method for manufacturing a protective film for a terminal surface comprising:
   S1) providing an original sheet, wherein the original sheet comprises a substrate layer and two hardened layers respectively disposed on two opposite sides of the substrate layer, a thickness of the substrate layer ranging from 0.08 mm to 0.25 mm, and a thickness of each of the two hardened layers ranging from 0.01 mm to 0.10 mm; and
   S2) hot pressing the original sheet by a hot pressing device, wherein the hot pressing device comprises an upper mold having a mold core, and a lower mold matching with the upper mold to press the original sheet, the lower mold has a mold cavity adapting to the mold core, the lower mold is provided with an inner rounded corner at a bottom edge of the mold cavity, a side of the mold core is provided with an outer rounded corner matching with the inner rounded corner; placing the original sheet in the mold cavity, and heating the upper mold and the lower mold clamping the original sheet to a set heating temperature, pressurizing the upper mold and the lower mold, and cooling the upper mold and the lower mold to a set cooling temperature, such that the original sheet becomes a protection film for a terminal surface having a curved surface portion.

2. The method of claim 1, wherein step S1) comprises cutting the original sheet to a size by laser.

3. The method of claim 1, wherein step S1) comprises forming the hardened layers on the two opposite sides of the substrate layer by coating and curing a UV coating by a UV coater.

4. The method of claim 1, wherein step S2) comprises applying a starting temperature of the upper mold and the lower mold clamping with the original sheet that ranges from 30° C. to 40° C., applying the set heating temperature that ranges from 145° C. to 175° C., and applying the set cooling temperature that ranges from 30° C. to 45° C.

5. The method of claim 1, wherein step S2) comprises using a hot pressing device that further comprises: a fixing board disposed under the lower mold, an upper board disposed above the upper mold and configured for pressing the upper mold, an elastic ejector configured for pushing the lower mold to space the lower mold apart from the fixing board, and a lower board disposed under the fixing board, the elastic ejector being mounted on the fixing board; the step of pressurizing the upper mold and the lower mold comprises raising the fixing board upward and pressing the upper board downward, such that, the upper board is pressed against the upper mold, and the elastic ejector is moved downward and the lower mold is pressed against the fixing board.

6. The method of claim 5, wherein in step S2), the upper board is provided with an upper cooling water channel, and the lower board is provided with a lower cooling water channel, and cooling water being injected through the upper cooling water channel and the lower cooling water channel to cool the upper mold and the lower mold to the set cooling temperature.

7. The method of claim 6, further comprising: in step S2), after the upper mold and the lower mold are cooled to the set cooling temperature, returning the upper board and separating the fixing board from the upper mold.

8. The method of claim 1, further comprising providing adhesive layers on at least one of the hardened layers located on an inner side thereof, and providing release films on two sides of the original sheet having the adhesive layers.

9. A method for manufacturing a protective film for a terminal surface comprising:
   S1) forming hardened layers on two opposite sides of a substrate layer by coating and curing a UV coating by a UV coater to provide an original sheet comprising the substrate layer and two hardened layers respectively disposed on the two opposite sides of the substrate layer; and
   S2) hot pressing the original sheet by a hot pressing device, wherein the hot pressing device comprises an upper mold having a mold core, and a lower mold matching with the upper mold to press the original sheet, the lower mold has a mold cavity adapting to the mold core, the lower mold is provided with an inner rounded corner at a bottom edge of the mold cavity, a side of the mold core is provided with an outer rounded corner matching with the inner rounded corner; placing the original sheet in the mold cavity, and heating the upper mold and the lower mold clamping the original sheet to a set heating temperature, pressurizing the upper mold and the lower mold, and cooling the upper mold and the lower mold to a set cooling temperature, such that the original sheet becomes a protection film for a terminal surface having a curved surface portion.

10. A method for manufacturing a protective film for a terminal surface comprising:

S1) providing an original sheet, wherein the original sheet comprises a substrate layer and two hardened layers respectively disposed on two opposite sides of the substrate layer; and S2) hot pressing the original sheet by a hot pressing device, wherein the hot pressing device comprises an upper mold having a mold core, and a lower mold matching with the upper mold to press the original sheet, the lower mold has a mold cavity adapting to the mold core, the lower mold is provided with an inner rounded corner at a bottom edge of the mold cavity, a side of the mold core is provided with an outer rounded corner matching with the inner rounded corner; placing the original sheet in the mold cavity, and heating the upper mold and the lower mold clamping the original sheet to a set heating temperature, pressurizing the upper mold and the lower mold, and cooling the upper mold and the lower mold to a set cooling temperature, such that the original sheet becomes a protection film for a terminal surface having a curved surface portion, wherein step S2) comprises applying a starting temperature of the upper mold and the lower mold clamping with the original sheet that ranges from 30° C. to 40° C., applying the set heating temperature that ranges from 145° C. to 175° C., and applying the set cooling temperature that ranges from 30° C. to 45° C.

* * * * *